Nov. 15, 1966  P. M. TERMET  3,284,845
SLAUGHTERING PISTOL FOR ANIMALS FOR FOOD
Filed Aug. 10, 1964  2 Sheets-Sheet 1
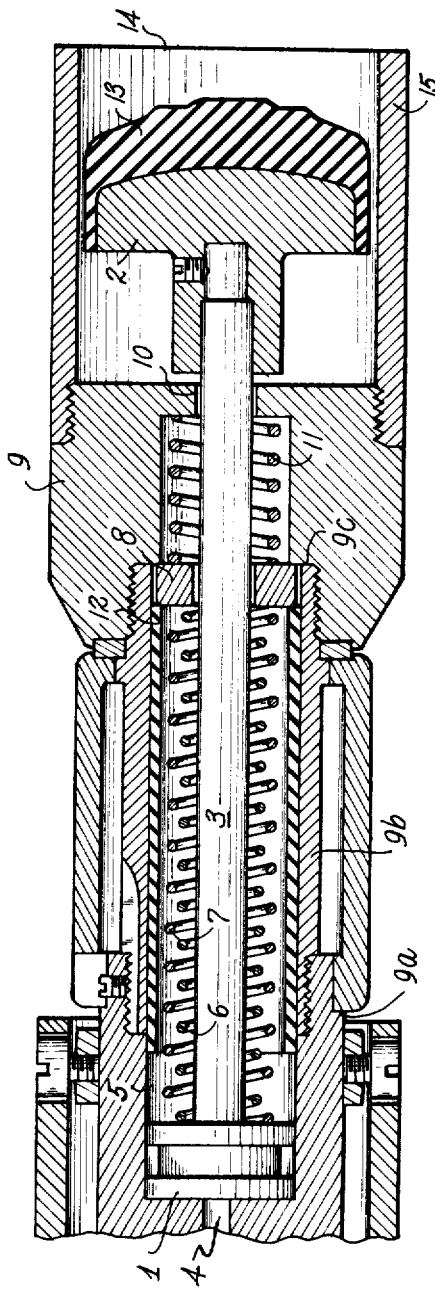
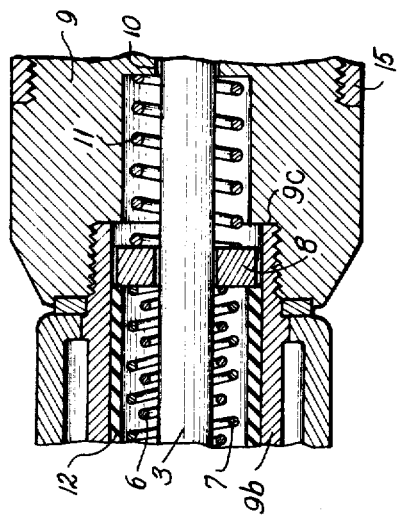
INVENTOR.
PIERRE MICHEL TERMET

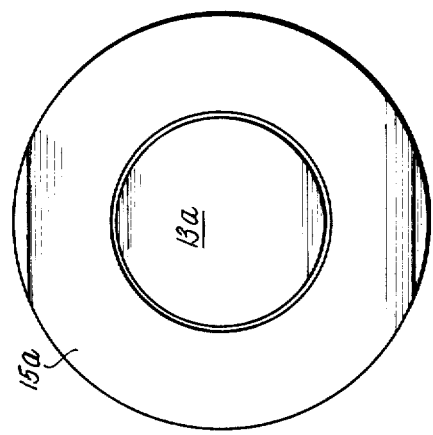
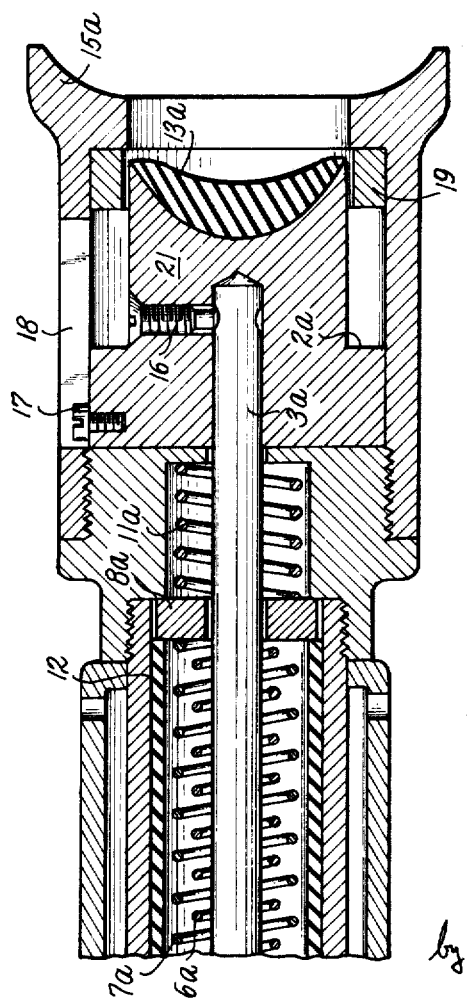

United States Patent Office 3,284,845
Patented Nov. 15, 1966

3,284,845
SLAUGHTERING PISTOL FOR ANIMALS FOR FOOD
Pierre Michel Termet, Lyon, France, assignor to Societe dite: Etablissements Termet Pere et Fils, a corporation of France
Filed Aug. 10, 1964, Ser. No. 388,528
Claims priority, application France, Aug. 14, 1963, 944,795, Patent 84,173
4 Claims. (Cl. 17—1)

It is known that devices have long been used adapted for slaughtering large animals for food such as bovines, which devices are actuated by the propulsive force of a cartridge.

In the majority of devices so far known, the gases originating from the explosion of the cartridge act on a piston which propels a pin towards the outside of the device and thus causes a perforation of the skull of the animal.

This method of slaughtering by trepanning, which has certain disadvantages for large animals, proves practically useless for the slaughtering of small animals such as calves and sheep.

In the case of small animals for food, the head and particularly the brain have considerable commercial value and these organs fall considerably in value when they have been perforated by the pin.

Moreover, the slaughtering of animals by means of a pin does not appear to have all the characteristics required from the strictly humane point of view because it is found that, after slaughter, the animal shows signs such as agitation, cries, groaning etc., which lead to the assumption that it is not in a state of complete unconsciousness.

It is for this reason that some specialists who have studied the question have recommended that the animals should be slaughtered not by perforation of the skull but by stunning.

Nevertheless, although this method of slaughter has already been regarded as preferable for some time, it has not been applied satisfactorily up to date because it is particularly difficult to carry out on an industrial scale.

Actually, the blow which the animal receives should, on the one hand be sufficient to bring it into a state of complete unconsciousness and on the other hand should not be sufficiently violent to cause the instantaneous death of the animal because animals for food should be bled and in order that this bleeding may take place under satisfactory conditions it is necessary for the heart to continue to beat at a slow rate.

The present invention relates to a slaughtering pistol, the characteristics of which are such that it does not have the disadvantages of the devices hitherto known and that it enables insensibility of the animal to be obtained reliably without reducing the commercial value of the brain and of the head.

Moreover, it has been found in the course of tests carried out by means of the device according to the invention that after having been felled, the animals are much calmer and in particular show much less agitation than animals felled by conventional means.

The slaughtering pistol according to the invention is of the type wherein the slaughter-head traverses a certain displacement inside the pistol between the instant the cartridge is caused to explode and the moment when said head strikes the skull of the animal.

In this type of device it is necessary to provide a device which restores the slaughter-head to its starting position after the firing of each cartridge.

The object of the present invention is a slaughtering pistol for small animals for food and particularly for calves and sheep, which is characterised in that the slaughter-head, which is rigidly connected to a piston which is displaced by action of the gases originating from the explosion of the cartridge, consists of a metallic head portion provided with a rubber covering or the like which latter comes directly into contact with the head of the animal to be slaughtered.

The present invention likewise relates to a slaughtering pistol of the aforesaid type characterised in that both the end of the pistol on the one hand and the end of the slaughter-head on the other are hollowed out to provide a cylindrical contour, the axis of said cylinder being perpendicular to the main axis of the slaughtering pistol in such a manner that the end of the pistol can be applied, properly oriented to a corresponding contour of the base of the nape of the neck of the animals to be slaughtered.

Finally, the invention relates to a slaughtering pistol of the aforesaid type, characterised in that one of the ends of the return spring or springs which restore the slaughtering head to its initial position, bears against a movable stop, itself subject to the action of a spring which is compressed in such a manner that automatic compensation is obtained despite wear of the return springs and the slaughtering head is always restored to its initial position.

As an aid to understanding the invention, several forms of embodiment will now be described by way of illustration and without any limiting character, being taken as examples and illustrated on the accompanying drawing in which:

FIGURE 1 is a view in longitudinal section through the end of a slaughtering pistol according to the invention;

FIGURE 2 is a partial view in section, corresponding to FIGURE 1, after slight wear of the return springs for the slaughter-head;

FIGURE 3 is a view in axial section of the end of a slaughtering pistol in another embodiment of the invention;

FIGURE 4 is an end view, corresponding to FIGURE 3, and looking from the right of FIGURE 3.

The drawing shows the piston 1 which is connected to the slaughter-head 2 through a rod 3 and which is propelled by the gases originating from the explosion of the cartridge situated in the chamber 4. The piston 1 is displaced inside the chamber 5 in the body formed by the members 9, 9a and 9b. The piston is restored towards the left by the two return springs 6 and 7 which bear, on the one hand against the piston 1 itself and on the other hand against the movable stop 8 surrounding the rod 3 and in the normal state resting against the member 9 in which a bore 10 serves as a guide for the rod 3. A compensating spring 11 fitted in a seating formed in the member 9 likewise bears against the movable stop 8. The relative forces of the return springs 6 and 7 on the one hand and 11 on the other hand are such that in the position of rest and without any wear of the return springs 6 and 7, the movable stop 8 bears against the fixed abutment 9c formed in the member 9.

The drawing likewise shows a shock-absorber 12 consisting of a hollow cylinder of rubber or similar material which is placed inside the chamber 5 and against which the piston 1 bears when it is propelled towards the right under the action of the gases originating from the explosion of the cartridge.

It will likewise be seen that the slaughter-head is covered at its front portion by a covering 13 of rubber or similar material. The effect of this covering is to dampen to some extent the shock produced by the slaughter-head on the animal's skull and to limit the damage to the brain without detracting from the effectiveness of the pistol.

FIGURE 1, which represents the position of rest of the device, likewise shows that the slaughter-head is withdrawn in relation to the end 14 of the cylindrical sleeve 15 situated at the end of the pistol in such a manner that the slaughter-head 2 has to cover a predetermined distance between the moment when the cartridge is fired and the moment when the head strikes the animal's skull.

FIGURE 2 shows how the compensating spring 11 works which, as previously explained, bears against the movable stop 8 in apposition to the return springs 6 and 7.

FIGURE 2 illustrates the position which the movable stop 8 occupies after relatively long use of the device and at a moment when the return springs 6 and 7 have already suffered a certain amount of wear and could not restore the piston 1 to the position which it occupies in FIGURE 1 if the stop 8 were fixed.

Assuming that the return springs 6 and 7 have suffered a certain amount of wear, they no longer have sufficient strength to push the movable stop 8 back sufficiently towards the right so that the compensating spring 11 displaces said movable stop 8 towards the left and thus enables the assembly comprising the piston 1, the slaughter-head 2 and the rod 3 which unites them, to be restored to the correct position at the moment when the cartridge is fired.

It will be seen that in these circumstances, even after the device has been in service for a very long time, that is to say after a certain amount of wear on the return springs 6 and 7, the correct positioning of the slaughter-head at the moment of firing is nevertheless obtained as a result of the compensating spring 11 which, as will easily be understood, is not subjected to any stress and consequently does not suffer any wear so long as the return springs 6 and 7 are themselves capable of restoring the piston 1 to the position illustrated in FIGURE 1.

FIGURES 3 and 4 illustrate in axial section and an end view respectively of another embodiment of the slaughtering pistol according to the invention. In this embodiment, the return springs 6a and 7a, the movable ring 8a and the compensating spring 11a are again found. It will likewise be seen how the slaughter-head 2a is fixed to the rod 3b by means of a screw 16.

In this embodiment of the invention, the front end of the sleeve 15a, inside which the slaughter-head is displaced, as well as the front portion of the slaughter-head 21, are cut away to a concave cylindrical contour, the axis of said a cylinder being perpendicular to the axis of the pistol and likewise perpendicular to the plane of FIGURE 3, in such a manner that the end of the pistol on the one hand and the end of the slaughter-head 21 have a corresponding shape which conforms substantially to the shape of the nape of the neck of the animal to be slaughtered.

In this embodiment it is preferable but not essential to cover the front face of the slaughter-head with a layer 13a of rubber or similar material.

As FIGURE 3 shows, a screw 17 fixed in the slaughter-head 21 is displaced in a longitudinal aperture 18 formed in the end of the pistol in such a manner that the slaughter-head 21 cannot execute any movement of rotation about the rod 3a.

As FIGURE 3 likewise shows, a shoulder 2a situated at the periphery of the slaughter-head 21 bears, at the end of the stroke of the head, against a second shock-absorber 19 formed by a rubber ring for example.

What I claim is:

1. In a slaughtering pistol for small food animals, having a longitudinally displaceable stunning head explosively actuated by gases generated by the detonation of a cartridge, said pistol comprising a rod and piston on which said stunning head is carried, a body defining a chamber in which said rod is slidably mounted, a fixed abutment in said chamber, a movable stop slidable in said chamber, return spring means positioned to simultaneously urge said rod and stunning head in one direction to a retracted position and said movable stop in the opposite direction against said fixed abutment, and compensating spring means positioned in the opposite side of said movable stop from said return spring means and biassing said movable stop away from said fixed abutment with a force insufficient to separate said movable stop from said fixed abutment which said return spring means is new, said return spring means being positioned to be compressed while absorbing the shock when said pistol is fired, but said compensating spring means being protected from such compression by impingement of said movable stop against said fixed abutment so that when the resilience of said return spring decreases due to repeated compression thereof during firing of said pistol, said compensating spring, having been less compressed during said firing, will expand and force said movable stop away from said fixed abutment so as to thereafter absorb a portion of the shock when said pistol is fired.

2. A slaughtering pistol according to claim 1 wherein said stunning head is covered by a cushion of elastic material.

3. A slaughtering pistol in accordance with claim 1 comprising a sleeve surrounding said stunning head within which sleeve said stunning head is longitudinally displaced and wherein said head and said sleeve have each a concave cylindrical contour.

4. In a slaughtering pistol according to claim 3 wherein said head is provided with stud means projecting into a longitudinal aperture in the wall of said sleeve, whereby rotation of said head with respect to said sleeve is prevented.

References Cited by the Examiner

UNITED STATES PATENTS

| 3,067,454 | 12/1962 | Catlin et al. | 17—1 |
| 3,068,601 | 12/1962 | Arrowsmith | 17—1 X |

FOREIGN PATENTS

| 913,679 | 6/1946 | France. |
| 371,716 | 4/1932 | Great Britain. |

SAMUEL KOREN, *Primary Examiner.*

LUCIE H. LAUDENSLAGER, *Examiner.*